United States Patent

[11] 3,571,886

[72] Inventor Robert J. Corsmeier
  Cincinnati, Ohio
[21] Appl. No. 828,272
[22] Filed May 27, 1969
[45] Patented Mar. 23, 1971
[73] Assignee General Electric Company

[54] ATTACHMENT DEVICE AND COOPERATING TOOL MEANS
16 Claims, 11 Drawing Figs.
[52] U.S. Cl. ................................................... 29/200,
  308/207
[51] Int. Cl. .................................................. B23p 19/04,
  F16c 43/00
[50] Field of Search .......................................... 308/187,
  207; 29/200 (P)

[56] References Cited
UNITED STATES PATENTS

| | | | | |
|---|---|---|---|---|
| 2,885,007 | 5/1959 | Hoffer | | 166/136 |
| 3,276,827 | 10/1966 | Diver et al. | | 308/187 |
| 3,285,004 | 11/1966 | Hopley | | 308/187X |
| 3,328,096 | 6/1967 | Lees et al. | | 308/207 |

Primary Examiner—William S. Lawson
Attorneys—Derek P. Lawrence, Erwin F. Berrier, Jr., Lee H. Sachs, Frank L. Neuhauser, Oscar B. Waddell and Joseph B. Forman ABSTRACT: An attachment device, for removably securing shaft components to a shaft, is disclosed together with cooperating tool means for use in attaching and removing the device at and from an inaccessible, predetermined position along the shaft. The attachment device includes means for preventing rotation thereof when properly located along the shaft, means for automatically positioning the device at the predetermined position along the shaft and preventing axial movement from that position in a first axial direction, and means remotely movable between a first position, wherein the device is secured in its predetermined position against axial movement in the second axial direction, and a second position, wherein the device may be moved into and from its predetermined position.

The tool means is adapted to engage radially outwardly projecting teeth provided on the device and actuate the remotely movable locking means carried by the device.

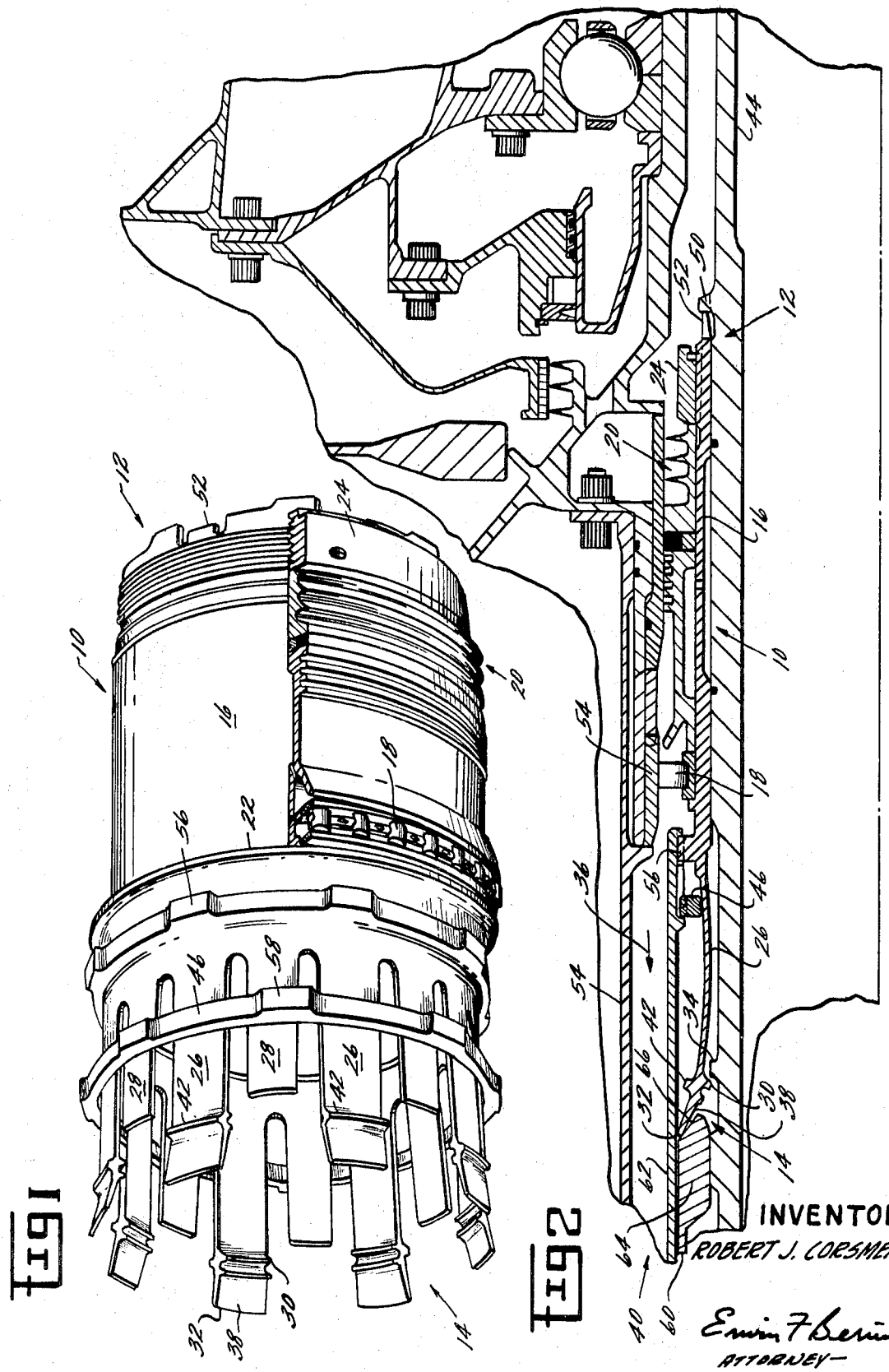

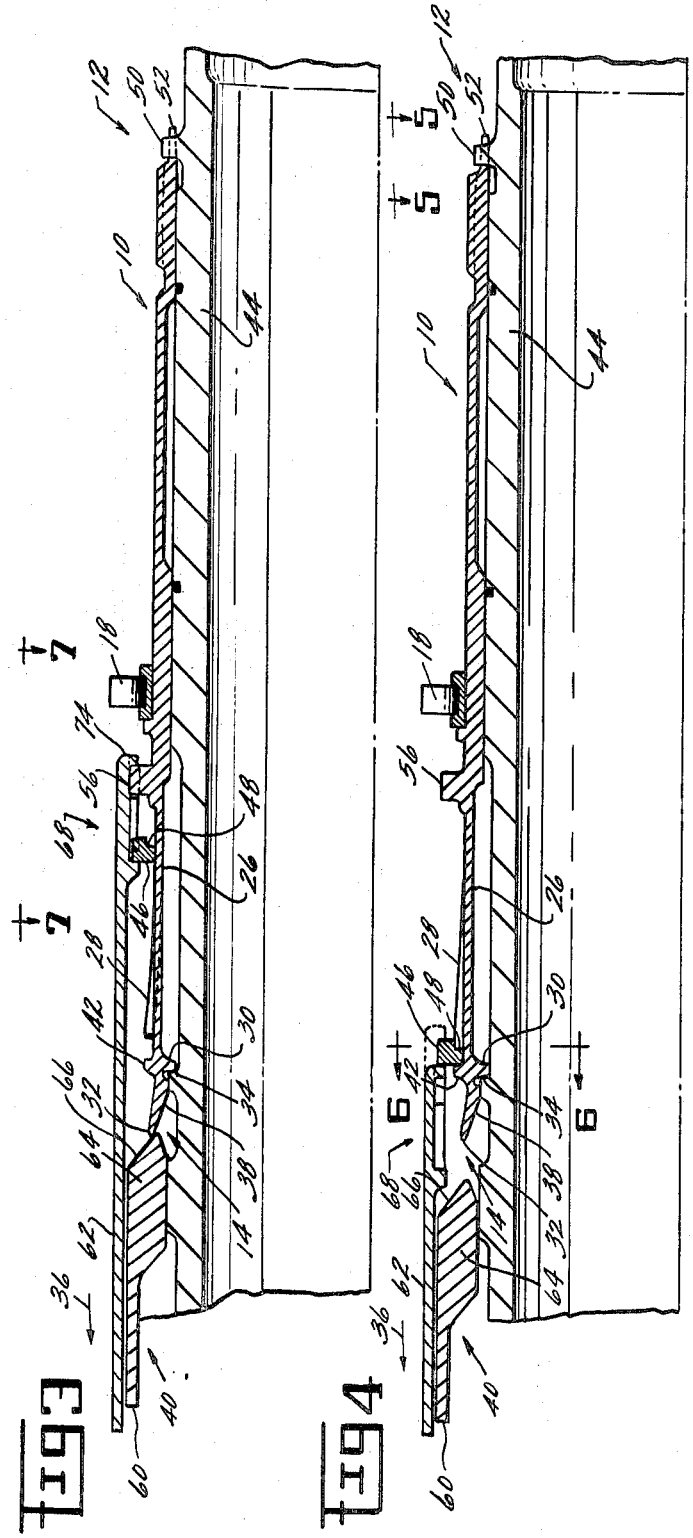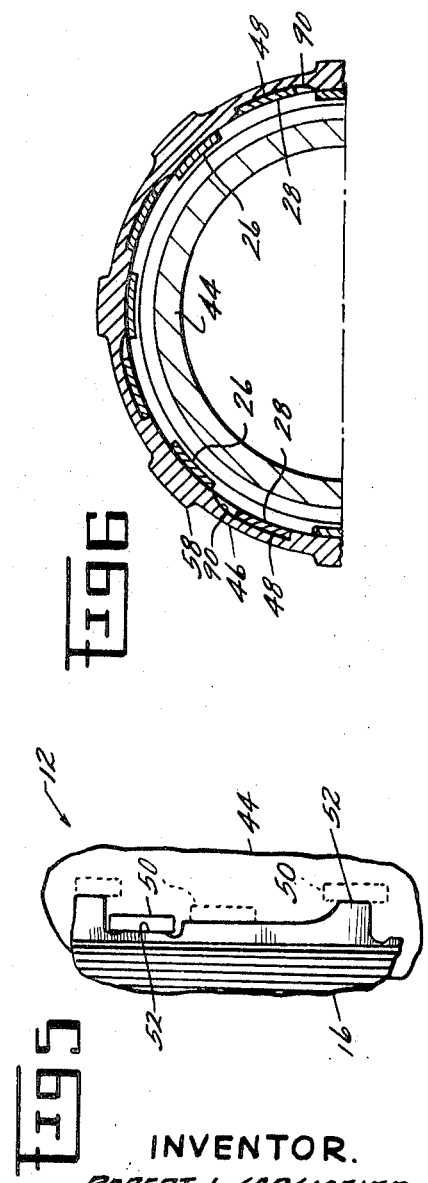
INVENTOR.
ROBERT J. CORSMEIER

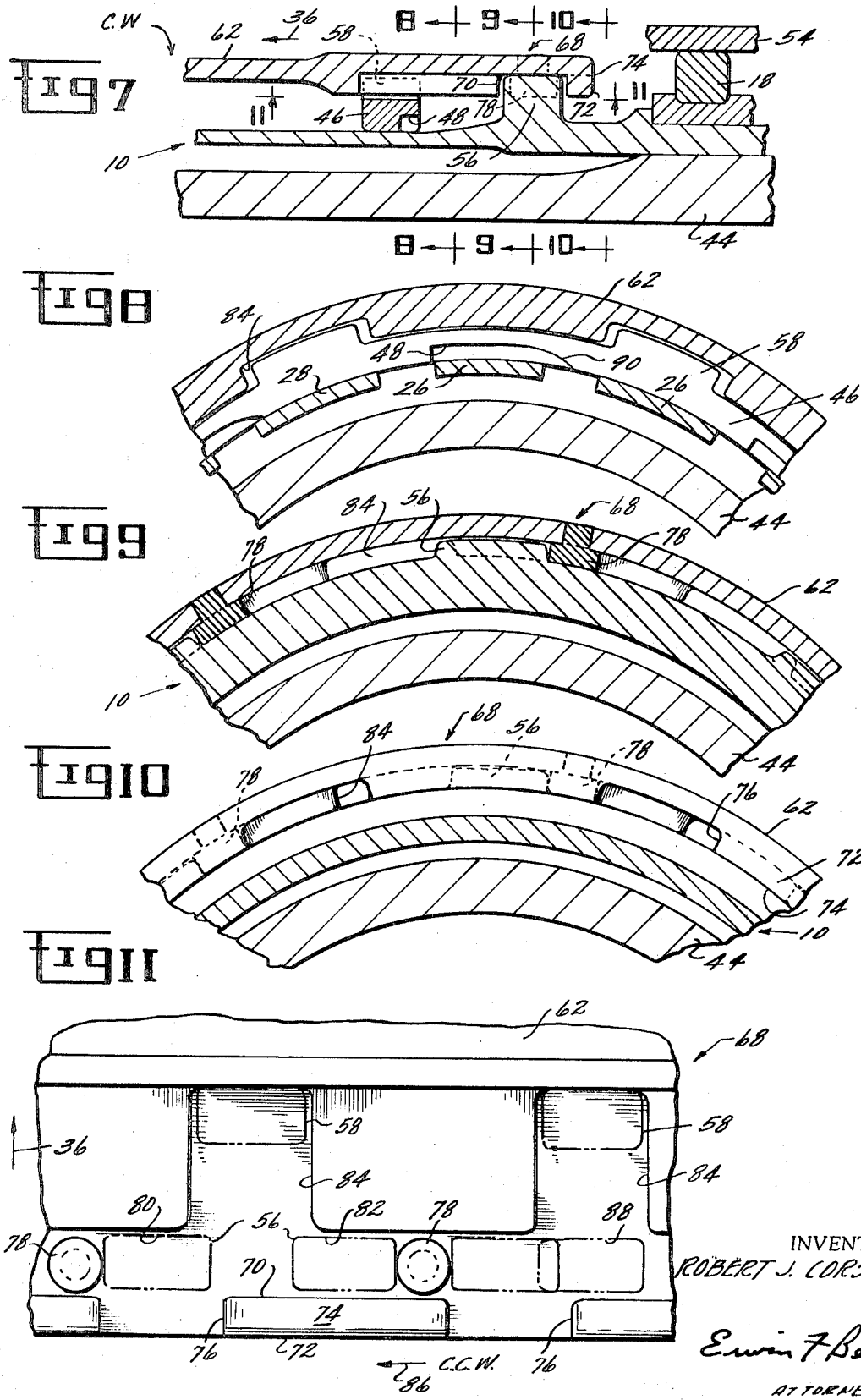

3,571,886

ATTACHMENT DEVICE AND COOPERATING TOOL MEANS

This invention relates to attachment means and cooperating tool means therefor and, more particularly, to means for remotely attaching and removing components to and from a shaft member in a remote, inaccessible location, as for example, on the inner shaft of a dual-shafted gas turbine engine.

In rotating machinery, such as gas turbine engines, it is often necessary or desirable to removably mount components such as bearings, seals, gears, splines and the like to a shaft. In many such applications, installation and/or removal must be accomplished in a relatively inaccessible or remote area along the shaft. For example, in gas turbine engines having concentric telescoping shafting arrangements wherein, because of the axial variations in shaft diameter, certain inner shaft components can only be installed with the shafts in a telescoped position, installation and removal of the inner shaft components may be extremely difficult. Further, although the rotating machinery design may be such as to permit installation of the shaft components before the shafts are telescoped, it may be desirable to remove such components for inspection, overhaul and maintenance purposes without necessitating removal of the shaft.

One solution to the foregoing problem which has been used heretofore is the provision of what would amount to a third shaft or tube member which carries the shaft components at one end and extends along the shaft to an accessible portion of the shaft, and there is secured to the shaft. While this approach permits installation and removal to shaft components in relatively inaccessible areas, it has certain characteristics which limit its usefulness. Specifically, a long tube member can substantially increase the weight of the rotating machinery which, in the case of an aircraft gas turbine engine, is extremely undesirable. Additionally, such an arrangement may cause significant imbalance during engine operation and is not well suited for transmitting torsional loading which, for example, would be present when the shaft component is a gear or spline.

The present invention, then is concerned with a shaft component carrier member and cooperating tool means which together facilitate the installation and removal of shaft components while overcoming the foregoing problems.

Briefly, the above and other objects, which will become apparent upon reading the following description of the preferred embodiment, are achieved in the present invention by providing a generally cylindrical carrier member sized to telescope over the shaft to which the components are to be secured. The leading end of the carrier member is formed with a plurality of circumferentially spaced, axially facing slots adapted to receive ears or tabs projecting radially from the shaft to provide a rotational stop and a unidirectional axial stop for the carrier member. The other, or trailing end of the carrier member is formed with a plurality of axially extending, spaced and alternating, long and short fingers. The long fingers include a radially inwardly extending, circumferential shoulder adapted to abut a cooperating circumferential shoulder carried by the shaft and thereby lock the carrier member against axial movement in the removal direction. To prevent the long fingers from moving radially outwardly after installation and thereby unlocking the carrier member against axial movement in the removal direction, a locking ring or collar is provided around the finger portion of the carrier member which is slidable to a position abutting stop means carried by the long finger members. The locking ring or collar is maintained in its locking position by the short fingers which are normally sprung or flared radially outwardly toward their free ends an and engage locking grooves in the collar. The locking grooves are formed with a circumferentially directed camming surface so that when the locking ring or collar is rotated in the direction of the camming surface, the short fingers are cammed out of the locking groove to permit movement of the collar to its unlocked position.

To facilitate attachment and r3m removal of the carrier member in a remote or inaccessible area, such as between telescoped shafts, an insertion and removal tool is provided which includes inner and outer telescoping and relatively slidable members. The outer tool member is formed with an annular positioning and locking head having means for telescoping engagement with the carrier member. The locking head is adapted to receive peripherally spaced, radially extending teeth which are provided on both the carrier member and the locking collar to facilitate axial and rotational positioning control over both the carrier member and locking collar. The inner tool member is provided with an annular head having a tapered outer end surface adapted to engage the free end of each long finger to deflect the long fingers radially outwardly into wedged abutment with the outer tool member. In this manner the carrier member is firmly gripped by the tool and the clearance between the long finger locking shoulders and their associated shaft shoulder is provided during installation or removal of the carrier member.

While the specification concludes with the claims particularly pointing out and distinctly claiming the subject matter of this invention, it is believed the invention will be better understood upon reading the following description of the preferred embodiment in conjunction with the accompanying drawings wherein:

FIG. 1 is a perspective view of the shaft component carrier member of this invention with portions of the shaft components broken away;

FIG. 2 is a partial cross-sectional view showing the carrier member and cooperating tool means of this invention, with the carrier member in a partially installed position between a pair of telescoped coaxial shafts;

FIG. 3 is a view like FIG. 2 with the outer shaft removed for clarity and showing the carrier member of this invention in a partially locked position on the inner shaft;

FIG. 4 is a view like FIG. 3 showing the carrier member of this invention in its locked position on the inner shaft;

FIG. 5 is a partial plan view taken along lines 5–5 of FIG. 4 and showing an exemplary embodiment of the leading end axial and rotational locking means employed by the carrier member together with cooperating inner shaft structure;

FIG. 6 is a partial cross-sectional view taken along lines 6–6 of FIG. 4;

FIG. 7 is an enlarged cross-sectional view of area 7–7 of FIG. 3;

FIG. 8 is a cross-sectional view taken along lines 8–8 of FIG. 7;

FIG. 9 is a cross-sectional view taken along lines 9–9 of FIG. 7;

FIG. 10 is a cross-sectional view taken along lines 10–10 of FIG. 7; and

FIG. 11 is a partial view taken along lines 11–11 of FIG. 7.

Referring now to the drawings and particularly to FIG. 1, the carrier member of this invention has been shown generally at 10 as being cylindrical in form and having leading and trailing end locking portions 12 and 14, respectively, and an intermediate or main body portion 16 on which components such as a bearing 18, sealing means 20, or the like may be mounted between a peripheral shoulder 22 and a retaining nut 24 which is threadably engaged with the carrier member.

The trailing or aft locking portion 14 of the carrier member 10 comprises a plurality of peripherally spaced, alternating long fingers 26 and short fingers 28 which extend generally axially of the carrier member 10. Each long finger 26 is formed with a radially inwardly projecting shoulder 30 adjacent its free end 32 which is adapted to abut a cooperating circumferential shaft shoulder 34, as shown in FIG. 3, to lock the carrier member against axial movement in the direction indicated by arrow 36 in FIG. 3. The inner surface of each long finger is flared radially outwardly from its shoulder 30 to its free end 32 as indicated at 38 to facilitate gripping of the carrier member 10 by an insertion and removal tool 40 as well as installation and removal of the carrier member. Additionally, each long finger 26 is provided with a radially outwardly projecting shoulder 42, the function of which will be hereinafter described.

As best shown in FIGS. 3 and 4, each short finger 28 is flared radially outwardly toward its free end and terminates in a position spaced from the long finger shoulder 42.

To facilitate locking of the carrier member 10 on a shaft 44 (as best shown in FIGS. 1 through 4), a locking ring or collar 46 is provided which is slidably carried by the aft locking portion 14 of the carrier member. As best shown in FIGS. 4 and 6, the locking collar extends around the fingers 26, 28 and is provided with a plurality of inwardly facing, locking grooves 48, each of which is adapted to receive one of the short fingers 28 when the collar is moved into close or abutting relationship with the long finger shoulders 42. As will be appreciated, with the collar 46 in its locked position, that is, when it is positioned between the short fingers 28 and the shoulder 42, as in FIG. 4, and with the short fingers engaged in the locking grooves 48, the long fingers are prevented from deflecting outwardly and, hence, the carrier member is retained against axial movement in the direction 36 by abutting shoulders 30 and 34.

The carrier member 10 is positioned in its predetermined position along the shaft 44 and is retained against axial movement in the insertion direction through abutment with radially outwardly projecting ears or tabs 50 on the shaft 44. To prevent rotation of the carrier member 10 on the shaft 44, the leading edge locking portion is provided with a plurality of peripherally spaced, axially facing slots 52, each of which is adapted to receive one ear or tab 50 as best shown in FIGS. 3, 4 and 5.

To facilitate installation and removal of the carrier member 10 at and from a remote or relatively inaccessible position along the shaft 44, as for example in applications where an outer shaft 54 is telescoped over the inner shaft 44 in the manner depicted in FIG. 2, the carrier member and the locking collar 46 are formed with a plurality of radially outwardly projecting, peripherally spaced teeth 56 and 58, respectively, and the insertion and removal tool 40 is provided.

The insertion and removal tool 40 includes an inner, generally annular tool member 60 and an outer, generally annular tool member 62 which telescopes over the inner tool. The inner tool is formed with an annular head 64 at one end which includes a tapered outer surface 66 adapted to engage the flared inner surface 38 of each long finger and cam or deflect the long fingers 26 outwardly, as in FIG. 2, to firmly grip the carrier member 10 and to allow passage of the long finger shoulders 30 over the cooperating shaft shoulder 34 during the installation or removal cycle.

With reference now to FIGS. 7 through 11, the outer tool member 62 has been shown as including a positioning and locking head 68 which is formed with a radially inwardly facing, circumferential groove 70 adapted to receive the carrier member teeth 56 and the locking collar teeth 58. The groove 70 is spaced from the end 72 of the outer tool so as to form a shoulder 74 therebetween. As best shown in FIG. 11, the shoulder 74 is provided with spaced axial slots 76 which are sized and peripherally spaced to permit entry of the carrier member and locking collar teeth 56, 58 into the groove 70.

Suitable stop means 78 are provided within the groove 70 to abut the carrier member teeth 56 and the locking collar teeth 58 and position such teeth either in axial alignment with the slots 76, as shown at 80 in FIG. 11, or in a position wherein the teeth are trapped behind the shoulder 74 as indicated at 82 in FIG. 11. A second plurality of axial slots 84 are provided in the outer tool member to receive the collar teeth 58 as best shown in FIG. 8.

The use, operation and function of the present invention are as follows:

With the shaft components mounted to the carrier member, and with the locking collar closely spaced to the ring of carrier member teeth 56, as in FIG. 2, the outer tool member 62 is advanced over the aft locking portion 14 of the carrier member and the collar teeth 58 are engaged in the axial slots 84 via slots 76 and groove 70. With the locking collar 46 so positioned, the carrier member teeth 56 are engaged in the groove 70 via slots 76 and the tool is rotated counterclockwise as viewed in FIG. 7 until the carrier member teeth 56 abut stop means 78 as at 82 in FIG. 11. The tapered surface 66 of the inner tool member 60 is then engaged with the flared surface 38 of each long finger 26 to cam or resiliently deflect the long fingers outwardly to the position of FIG. 2 wherein their free ends 32 are wedged against the outer tool member 62 and sufficient clearance is provided to allow free passage of the shoulder 30 over the cooperating inner shaft shoulder 34. It will be noted that the wedging action of the inner tool member coupled with the engagement of the teeth 56, 58 and the positioning and locking head 68 provide means for securely gripping the carrier member 10 during the installation or removal cycle.

With the tool means 40 engaged with the carrier member as described above, the carrier member is moved in the insertion direction (opposite arrow 36) over the inner shaft 44 and into abutment with the inner shaft ears 50 as shown in FIG. 2. The tool 40 is then rotated and urged axially in the installation direction until the inner shaft ears 50 engage the locking portion slots 52, as best shown in FIGS. 3, 4 and 5. In this manner, the carrier member and shaft components are located at their predetermined position along the shaft and are locked against rotational movement and further axial movement in the installation direction. With the carrier member 10 in its predetermined position, the inner tool member 60 is withdrawn or moved in the direction of the arrow 36 whereupon the long fingers 26 resiliently return to their free or nondeflected position placing long finger shoulders 30 in abutment with the shaft shoulder 34, as in FIG. 3, to lock the carrier member 10 against axial movement in the removal direction.

With reference now to FIG. 11, the outer tool member 62 is then rotated clockwise into the position indicated at 80 wherein the teeth 56 abut so stop means 78 and are automatically placed in axial alignment with the slots 76. With the carrier member teeth 56 so positioned, the outer tool member 62 is withdrawn or moved in the direction of the arrow 36 which automatically disengages the carrier member teeth 56 from the positioning and locking head 68 and places the locking collar teeth 58 in abutment with the shoulder 74 as indicated at 88 in FIG. 11. The outer tool member 62 is further moved in the direction of arrow 36, pulling the collar 46 along the long and short fingers 26, 28, until the locking collar 46 abuts the long finger shoulders 42. The outer tool member is then rotated counterclockwise placing the locking collar teeth 58 in abutment with the stop means 78, as at 82 in FIG. 11, and the collar is until the short fingers 28, which have been resiliently deflected inwardly, snap into the locking grooves 48 to retain the collar against axial movement in a direction opposed to arrow 36. Accordingly, it will be noted that means are provided in the form of short fingers 28, shoulders 42 and the locking collar 46 to prevent the long fingers 26 from centrifugally deflecting out of locking abutment with the shaft shoulder 34 during shaft rotation.

With the carrier member 10 in the locked position of FIG. 4, the outer tool member 62 is removed simply by rotating such member clockwise until the collar teeth 58 assume the position indicated at 80. With the teeth 58 aligned with the slots 76, the outer tool member 62 may be withdrawn, completing the installation cycle.

To remove the carrier member 10 for inspection, repair or replacement of the shaft components, the outer tool member 62 is engaged with the locking collar teeth 58 and rotated counterclockwise as viewed in FIGS. 6 and 11. The locking collar grooves 48 are provided with a camming surface 90, as best shown in FIGS. 6 and 8, so that when the locking collar is so rotated the short fingers 28 are urged from their locking position of FIG. 6 to the unlocked position of FIG. 8 whereupon the locking collar may be moved toward the ring of carrier member teeth 56 so as to permit engagement of such teeth with the groove 70. After positioning the teeth 56 in the position indicated at 82 in FIG. 11, the inner tool member 60 is telescoped within the outer member 62 and is engaged with the flared surface 38, as in FIG. 3, to resiliently deflect the long fingers 26 out of locking abutment with the shaft shoulder 34 and firmly grip the carrier member. With the locking collar 46 out of its locking position of FIG. 4 and the long fingers deflected as in FIG. 2, the carrier member may be removed from shaft 44.

From the foregoing, it will be appreciated that the present invention provides lightweight means of relatively short axial length for quickly and easily securing, in a readily removable manner, shaft components to a shaft at a predetermined, relatively inaccessible position along the shaft.

While the carrier member 10 of this invention has been depicted and described as having eight long fingers and eight short fingers, it will be appreciated that the number may be varied.

Additionally, although the carrier member and locking collar have been shown as having eight teeth each, it will be understood that this number may also be varied and that while the peripheral spacing must be such as to allow insertion of the teeth within the outer tool locking head 68, there need not be an equal member of teeth on these members.

While the means for locking the carrier member against movement in the insertion direction (opposite to arrow 36) and against rotation have been shown as comprising cooperating ears 50 and carrier member slots 52, it will be appreciated that other suitable means may be employed. For example, a splined connection may be provided to rotationally lock the carrier member to the shaft 44 and a suitable projection from shaft 44 may be utilized to provide an axial abutment to locate the carrier member. While the positioning and locking head has been shown as having an axial slot 76 for each tooth 56, 58, a rotationally displaced axial slot 84 for each tooth 58 and stop means 78 for each tooth 56, 58, it will be appreciated that an axial slot 84 and stop means 78 need not be provided for each such tooth.

Although a preferred embodiment of the invention has been depicted and described, such embodiment is intended to be exemplary only and not definitive and it will be appreciated by those skilled in the art that many substitutions, alterations and changes may be made thereto without departing from the invention's fundamental theme.

I claim:

1. For use in removably securing components to a shaft, in combination;

an annular carrier member adapted to telescopingly engage the shaft for sliding movement therealong in a first and second axial direction;

means for securing said components to the carrier member;

first means cooperatively defined by said carrier member and said shaft for positioning said carrier member and, hence, a said components at a predetermined location along said shaft and preventing axial movement from said predetermined location in said first direction;

second means cooperatively defined by said carrier member and said shaft for preventing relative rotation between said shaft and said carrier member when the latter is in said predetermined location; and remotely actuatable locking means carried by said carrier member and movable between a locked position, engaging said shaft and locking said carrier member against axial movement in said second direction from said predetermined position, and an unlocked position enabling movement of said carrier member in said first and second direction, respectively, into and from said predetermined position.

2. The structure of claim 1 further characterized in that said first and second means comprise a plurality of peripherally spaced ears projecting radially from said shaft and a plurality of axially opening slots formed in said carrier member, each said slot adapted to axially receive one said ear.

3. The structure of claim 1 further characterized by and including remotely actuatable means for prohibiting movement of said locking means out of said locked position.

4. The structure of claim 1 further characterized in that said locking means comprise a plurality of first fingers extending generally axially from said carrier member in said second direction, said first fingers being resiliently deflectable from said locked position to said unlocked position, each said first finger formed with a radially inwardly projecting shoulder adapted to abut cooperating shoulder means on said shaft to prohibit movement of said carrier member from said predetermined position in said second direction.

5. The structure of claim 4 further characterized in that the inner surface of each said first finger is flared between its inwardly projecting shoulder and its free end whereby said first fingers will be deflected radially outwardly to said unlocked position when acted upon by an axially directed force in said first direction and will assume said locked position when said force is removed.

6. The structure of claim 4 further characterized by and including means for prohibiting deflection of said first fingers out of said locked position.

7. The structure of claim 6 further characterized in that said means for prohibiting deflection of said first fingers includes an annular collar surrounding said first fingers and axially slidable therealong to a position generally overlying said first finger shoulders and means for maintaining said collar in said overlying position.

8. The structure of claim 7 further characterized in that said carrier member and said collar are each formed with a ring of peripherally spaced, radially outwardly projecting teeth adapted to facilitate gripping and manipulation thereof with tool means from a remote position.

9. The structure of claim 7 further characterized in that said means for maintaining said collar in said overlying position comprises a radially outwardly projecting shoulder carried by each said first finger and a plurality of second fingers extending generally axially from said carrier member in said second direction, said second fingers adapted for resilient deflection from a first position, wherein said collar is prohibited from moving from said overlying position in said first direction, and a second position enabling axial movement of said collar along said fingers to and from said overlying position.

10. The structure of claim 9 further characterized in that said radially outwardly projecting first finger shoulders are axially disposed intermediate the ends of said first and second fingers, said collar having an axial width greater than the axial distance between the outwardly projecting first finger shoulders and the free ends of said second fingers and formed with an inwardly facing locking groove for each said second finger, said locking grooves adapted to receive said second finger.

11. The structure of claim 10 further characterized in that one sidewall of each said locking groove is adapted, upon rotation of said collar in a predetermined direction, to deflect its respective second finger to its second position.

12. Tool means for use in installing and removing a shaft component carrier member at and from a predetermined, relatively inaccessible position along a shaft, said carrier member of the type having means for preventing axial movement of said carrier member from said predetermined position in a first axial direction and relative rotation between said carrier member and said shaft, and finger means extending axially from said carrier member in a second axial direction and adapted for resilient deflection from a first position, wherein said carrier member is locked against axial movement from said predetermined position in a said second axial direction, to a second position enabling movement of said carrier member to and from said predetermined position, said tool means comprising:

a first, generally annular member having a head at one end adapted to telescopingly engage a portion of said carrier member, said head including stop means adapted to abut radially outwardly projecting teeth on said carrier member to provide rotational position control of said carrier member; and a second, generally annular member slidably carried within said first member, said second member adapted, at one end, to engage and resiliently deflect said finger means to said second position when acted upon by a force in said first axial direction.

13. The structure of claim 12 further characterized in that said head is formed with an inwardly facing, circumferential groove spaced from the free end of said head, said groove sized to receive said carrier member teeth, said stop means disposed in said groove, and at least one axial entry slot for each said carrier member tooth which extends from the free end of said head to said groove to permit entry of said teeth to said groove.

14. The structure of claim 13 further characterized in that said stop means is adapted to abut at least one said carrier member tooth to selectively position the carrier member teeth in a first position, in axial alignment with said entry slots, and a second position out of axial alignment with said entry slots wherein axial movement may be imparted to said carrier member through abutment between the teeth and the groove walls.

15. The structure of claim 13 wherein a locking collar is provided around said finger means, said collar including a plurality of radially outwardly projecting teeth and being axially slidable along said finger means to a locking position adjacent the free end of said finger means, wherein said finger means is prevented from deflecting out of said first position, and an unlocked position closely adjacent said carrier member teeth wherein said finger means may be deflected, said head further including a plurality of inwardly facing locking slots extending axially in said second direction from said groove, each said locking slot adapted to receive at least one said collar tooth, said entry slots and said groove sized to permit entry of said collar teeth into said locking slots.

16. The structure of claim 15 further characterized in that the axes of said locking slots are rotationally displaced from the axes of said entry slots.